(12) United States Patent
Niemelä et al.

(10) Patent No.: US 9,858,416 B2
(45) Date of Patent: *Jan. 2, 2018

(54) MALWARE PROTECTION

(71) Applicant: F-Secure Oyj, Helsinki (FI)

(72) Inventors: Jarno Niemelä, Kirkkonummi (FI); Mikko Hyppönen, Helsinki (FI); Santeri Kangas, Helsinki (FI)

(73) Assignee: F-Secure Oyj, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,461

(22) Filed: Sep. 13, 2016

(65) Prior Publication Data

US 2016/0378985 A1 Dec. 29, 2016

Related U.S. Application Data

(63) Continuation of application No. 12/661,389, filed on Mar. 15, 2010, now Pat. No. 9,501,644.

(51) Int. Cl.
*G06F 21/00* (2013.01)
*G06F 21/56* (2013.01)
*G06F 21/62* (2013.01)
*G06F 21/53* (2013.01)

(52) U.S. Cl.
CPC .......... *G06F 21/565* (2013.01); *G06F 21/566* (2013.01); *G06F 21/53* (2013.01); *G06F 21/629* (2013.01)

(58) Field of Classification Search
CPC .................................................... G06F 21/553
See application file for complete search history.

(56) References Cited

U.S. PATENT DOCUMENTS

| | | | | |
|---|---|---|---|---|
| 7,093,239 B1 * | 8/2006 | van der Made | ...... | G06F 21/562 714/38.13 |
| 7,984,304 B1 * | 7/2011 | Waldspurger | ......... | G06F 21/565 713/187 |
| 8,001,606 B1 * | 8/2011 | Spertus | .................. | G06F 21/564 709/203 |
| 8,056,136 B1 | 11/2011 | Zaitsev | | |
| 8,201,246 B1 * | 6/2012 | Wu | ....................... | G06F 21/554 703/23 |
| 8,341,745 B1 | 12/2012 | Chau et al. | | |
| 8,402,529 B1 * | 3/2013 | Green | ................. | H04L 63/1416 726/11 |
| 8,701,190 B1 | 4/2014 | Chau et al. | | |
| 8,789,174 B1 * | 7/2014 | Gupta | ................... | G06F 21/552 709/223 |

(Continued)

FOREIGN PATENT DOCUMENTS

| | | |
|---|---|---|
| EP | 1549012 A1 | 6/2005 |
| WO | 9847069 | 10/1998 |

*Primary Examiner* — Ali Shayanfar

(74) *Attorney, Agent, or Firm* — Harrington & Smith

(57) ABSTRACT

According to a first aspect of the present invention there is provided a method of protecting a computer system from malware, which malware attempts to prevent detection or analysis when executed in an emulated computer system. The method comprises determining if an executable file should be identified as being legitimate and, if not, executing the executable file while providing indications to the executable file that it is being executed within an emulated computer system.

13 Claims, 4 Drawing Sheets

(56) References Cited

U.S. PATENT DOCUMENTS

| | | | |
|---|---|---|---|
| 8,832,829 B2 * | 9/2014 | Manni | G06F 21/566 726/22 |
| 2005/0187740 A1 * | 8/2005 | Marinescu | G06F 21/566 703/1 |
| 2008/0147612 A1 * | 6/2008 | Gryaznov | G06F 21/564 |
| 2008/0244572 A1 * | 10/2008 | Sahita | G06F 9/45533 718/1 |
| 2009/0089040 A1 * | 4/2009 | Monastyrsky | G06F 21/566 703/26 |
| 2009/0125902 A1 * | 5/2009 | Ghosh | G06F 9/45533 718/1 |
| 2010/0017883 A1 | 1/2010 | Wang et al. | |
| 2010/0031353 A1 * | 2/2010 | Thomas | G06F 11/3604 726/22 |
| 2010/0064369 A1 | 3/2010 | Stolfo et al. | |
| 2010/0077476 A1 | 3/2010 | Adams | |
| 2010/0192222 A1 | 7/2010 | Stokes et al. | |
| 2010/0313035 A1 | 12/2010 | Turbin et al. | |
| 2011/0219447 A1 * | 9/2011 | Horovitz | G06F 9/45533 726/22 |
| 2011/0271342 A1 * | 11/2011 | Chung | G06F 21/554 726/23 |
| 2012/0304244 A1 | 11/2012 | Xie et al. | |
| 2013/0091570 A1 * | 4/2013 | McCorkendale | G06F 21/56 726/23 |
| 2013/0125119 A1 * | 5/2013 | Vipat | G06F 9/45533 718/1 |
| 2014/0223437 A1 * | 8/2014 | Chang | G06F 9/4881 718/102 |
| 2014/0317773 A1 * | 10/2014 | Kishore | A01H 1/04 800/267 |
| 2016/0196425 A1 * | 7/2016 | Davidov | G06F 21/566 726/23 |
| 2016/0283716 A1 * | 9/2016 | Momot | G06F 21/566 |

* cited by examiner

MALWARE PROTECTION

CROSS REFERENCE TO RELATED APPLICATION

This patent application is a continuation application of copending U.S. patent application Ser. No. 12/661,389, filed on Mar. 15, 2010, the disclosure of which is incorporated by reference herein in its entirety.

TECHNICAL FIELD

The present invention relates to a method of protecting a computer system from malicious activity of malware programs.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious and unwanted software.

When a device is infected by a malware program the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware. Furthermore, even if a malware infection does not cause a perceptible change in the performance of a device, it may be performing other malicious functions such as monitoring and stealing potentially valuable commercial, personal and/or financial information, or hijacking a device so that it may be exploited for some illegitimate purpose.

Many end users make use of anti-virus software to detect and possibly remove malware. In order to detect a malware file, the anti-virus software must have some way of identifying it amongst all the other files present on a device. Typically, this requires that the anti-virus software has a database containing the "signatures" or "fingerprints" that are characteristic of individual malware program files. When the supplier of the anti-virus software identifies a new malware threat, the threat is analysed and its signature is generated. The malware is then "known" and its signature can be distributed to end users as updates to their local anti-virus software databases.

Using approaches that rely on signature scanning to detect malware still leaves computers vulnerable to "unknown" malware programs that have not yet been analysed for their signature. To address this issue, in addition to scanning for malware signatures, most anti-virus applications additionally employ heuristic analysis. This approach involves the application of general rules intended to distinguish the behaviour of any malware from that of clean/legitimate programs. For example, the behaviour of all programs on a PC is monitored and if a program attempts to write data to an executable program, the anti-virus software can flag this as suspicious behaviour. Heuristics can be based on behaviours such as API calls, attempts to send data over the Internet, etc.

In order to detect and/or analyse malware programs, it is often useful to run a program in an isolated environment or test system, otherwise known as a virtual machine or emulator. A virtual machine or emulator comprises a program that mimics the functionality of various components of a real computer system. For example, a computer using a Linux® operating system can run a virtual machine that imitates the environment provided by a Windows® operating system. This can include emulation of the CPU, the memory, the communications interfaces and any associated hardware. By running a program in an emulated environment, any malicious activity can be confined to the virtual environment without risking the underlying computer system. The behaviour of a program within the emulated environment can then be observed, and any malware signatures or malicious behaviour used to identify the program as malware. In addition, for a program that has been or is suspected of being malware, anti-virus engineers usually run the program in an emulated environment in order to analyse or 'debug' its behaviour. This allows anti-virus engineers to reverse engineer the malware program, and thereby determine ways of detecting and then disinfecting computers infected by the program.

Malware authors therefore try to avoid malware detection and analysis tools that use emulation and/or debugging techniques. To do so, they design the malware to detect when they are being executed in an emulated environment and/or when they area being debugged. If such a malware program determines that it is being executed in an emulated environment and/or that it is being debugged, it will then either terminate itself as soon as possible or alter its behaviour so as to not perform any malicious activity or otherwise suspicious behaviour.

SUMMARY

It is an object of the present invention to provide a method of protecting a computer system from malicious activity of malware programs.

According to a first aspect of the present invention there is provided a method of protecting a computer system from malware, which malware attempts to prevent detection or analysis when executed in an emulated computer system. The method comprises determining if an executable file should be identified as being legitimate and, if not, executing the executable file whilst providing indications to the executable file that it is being executed within an emulated computer system. The file is preferably executed in the non-emulated computer system.

The step of determining if an executable file should be identified as being legitimate can be performed at the computer system. Alternatively, the computer system sends the executable file or an identifier for the executable file to a server, and receives a response from the server indicating whether or not the file should be identified as being legitimate.

The step of determining if an executable file should be identified as being legitimate can comprise any of
  determining if an identifier for the executable file is contained in a database identifying legitimate executable files and, if so, identifying the executable file as legitimate;
  determining if an identifier for the executable file is contained in a database identifying prohibited executable files and, if not, identifying the executable file as legitimate; and determining if an identifier for the executable file is contained in a database of information relating to executable files, the database including a value indicating the legitimacy of each executable file and, if so, determining if the value associated with the executable file exceeds a threshold at which an executable file is considered to be legitimate.

The step of providing indications to the executable file that it is being executed within an emulated computer system can comprise intercepting specified communications between the executable file and the computer system during execution of the executable file, and responding to the intercepted communications with data that is indicative of execution in an emulated computer system. The specified communications can include any of function calls, messages and events.

According to a second aspect of the present invention there is provided a computer program comprising computer program code means adapted to perform all the steps of the first aspect when said program is run on a computer.

According to a third aspect of the present invention there is provided a computer program according to the second aspect embodied on a computer readable medium.

According to a fourth aspect of the present invention there is provided a computer system. The computer system comprises:
    a memory, the memory storing an executable file; and
    a processor for determining if the executable file should be identified as being legitimate, and, if it is determined that the executable file should not be identified as being legitimate, for executing the executable file in the computer system whilst providing indications to the executable file that it is being executed within an emulated computer system.

The processor can be further configured to generate a message for sending to a server, the message including the executable file or an identifier for the executable file, and to process a response received from the server to determine if it indicates that the file should be identified as being legitimate. The computer system can further comprise a transmitter for sending the message to the server, and a receiver for receiving the response from the server.

The memory can be further configured to store a database identifying legitimate executable files, and the processor can be further configured to determine if an identifier for the executable file is contained in the database identifying legitimate executable files. Alternatively, the memory can be further configured to store a database identifying prohibited executable files, and the processor can be further configured to determine if an identifier for the executable file is contained in the database identifying prohibited executable files. As a further alternative, the memory can be further configured to store a database of information relating to executable files, the database including a value indicating the legitimacy of each executable file, and the processor can be further configured to determine if an identifier for the executable file is contained in the database of executable files. Preferably, the processor can be further configured to, if an identifier for the executable file is contained in the database, determine if the value associated with the executable file exceeds a threshold at which an executable file is considered to be legitimate.

The processor can be further configured to intercept specified communications between the executable file and the computer system during execution of the executable file, and to respond to the intercepted communications with data that is indicative of execution in an emulated computer system.

According to a fifth aspect of the present invention there is provided a method of detecting potential malware. The method comprises executing an executable file whilst providing indications to the executable file that it is being executed within an emulated computer system, monitoring the behaviour of the executable file, and determining if this behaviour corresponds with that expected of malware executed in an emulated computer system.

The step of executing an executable file whilst providing indications to the executable file that it is being executed within an emulated computer system can comprise executing the executable file in a non-emulated computer system, intercepting specified communications between the executable file and the computer system during execution of the executable file, and responding to intercepted communications with data that is indicative of execution in an emulated computer system. Alternatively, the step of executing an executable file whilst providing indications to the executable file that it is being executed within an emulated computer system can comprise executing the executable file in an emulated computer system.

The behaviour that is expected of malware executed in an emulated computer system can comprise any of:
    attempting to prevent execution without providing a notification;
    attempting to collect information relating to the emulated computer system; and
    significant variation from the behaviour of the executable file in a non-emulated computer system.

According to a sixth aspect of the present invention there is provided a computer program comprising computer program code means adapted to perform all the steps of the fifth aspect when said program is run on a computer.

According to a seventh aspect of the present invention there is provided a computer program according to the sixth aspect embodied on a computer readable medium.

According to an eighth aspect of the present invention there is provided a computer system. The computer system comprises:
    a memory, the memory storing an executable file; and
    a processor for executing an executable file whilst providing indications to the executable file that it is being executed within an emulated computer system, for monitoring the behaviour of the executable file, and for determining if this behaviour corresponds with that expected of malware executed in an emulated computer system.

The processor can be further configured to execute the executable file in a non-emulated computer system, intercept specified communications between the executable file and the computer system during execution of the executable file, and to respond to intercepted communications with data that is indicative of execution in an emulated computer system. Alternatively, the processor can be further configured to execute the executable file in an emulated computer system.

The processor can be further configured to determine if the behaviour of the executable file comprises any of:
    attempting to prevent execution without providing a notification;
    attempting to collect information relating to the emulated computer system; and
    significant variation from the behaviour of the executable file in a non-emulated computer system.

According to a ninth aspect of the present invention there is provided a method of maintaining a database of information relating to executable files, the database including values representing the legitimacy of each executable file, for the purpose of enabling any of a plurality of computer devices to determine if an executable file should be identified as being legitimate. The method comprises, at a network based service, receiving data regarding an executable file from a computer device of the plurality of computer devices that has executed the executable file, using the data to determine a value representing the legitimacy of the executable file, and providing the value to any of the plurality of computer devices.

The data regarding an executable file can comprise any of:
an identifier for the computer system that has executed the executable file;
information regarding any suspicious behaviour of the executable file observed by the computer system that has executed the executable file; and
a value representing the legitimacy of the executable file as determined by the computer system that has executed the executable file.

The step of using the data to determine a value representing the legitimacy of each of the executable files can comprise any of:
determining if each of the computer systems that has executed the executable file is trusted, and determining the value based on the number or proportion of trusted computer systems that have executed the executable file;
analysing the information regarding any suspicious behaviour of the executable file observed by each of the computer systems that have executed the executable file, and determining the value based on the amounts, types and extent of the suspicious behaviour; and
collating the values determined by each of the computer system that have executed the executable file.

According to a tenth aspect of the present invention there is provided a computer program comprising computer program code means adapted to perform all the steps of the ninth aspect when said program is run on a computer.

According to an eleventh aspect of the present invention there is provided a computer program according to the tenth aspect embodied on a computer readable medium.

According to a twelfth aspect of the present invention there is provided a server for use in maintaining database of information relating to executable files, the database including values representing the legitimacy of each executable file, for the purpose of enabling any of a plurality of computer devices to determine if an executable file should be identified as being legitimate. The server comprises a receiver for receiving data regarding an executable file from one or more of a plurality of computer devices that have executed the executable file, a processor for using the information to determine a value representing the legitimacy of the executable file, and a transmitter for providing the value to one or more of the plurality of computer devices.

DETAILED DESCRIPTION

It has been recognised here that the security of a computer system could be improved by making it appear that all programs on the computer are being run in a virtual environment, rather than on the actual computer system. In doing so, any malware on the computer system that is designed to avoid detection in a virtual environment would be unlikely to perform any of the malicious activity that would give away its presence or allow it to be analysed. The malware program would effectively be neutralised. This could be achieved by 'faking' those characteristics that indicate that a program is being executed in a virtual environment. However, many legitimate/trustworthy programs have also been designed to prevent themselves from being executed in a virtual environment as a method of copy protection, to prevent users from using emulation to circumvent the end of a trial period or otherwise escape paying the software licence fee. It is therefore not desirable to fake emulation for all programs run on a computer system, as this would be detrimental to the computer systems ability to run such legitimate programs.

In order to at least partially overcome the problems described above, it is proposed here to check the reputation of an executable file and, if it is determined that the file could possibly be or is likely to be malware (e.g. if it is not known to be benign/legitimate), then the executable file is executed with emulation imitation applied to it. However, if an executable file is determined to be legitimate or low risk, then the executable file is executed in the computer system without any emulation imitation applied to it. In doing so, the present invention provides that the execution of legitimate programs that use emulation detection for legitimate purposes will not be affected, whilst also providing that any malware executable files that have emulation detection are unlikely to execute their malicious code in the belief that they need to evade detection, disinfection or analysis.

Figure 1:
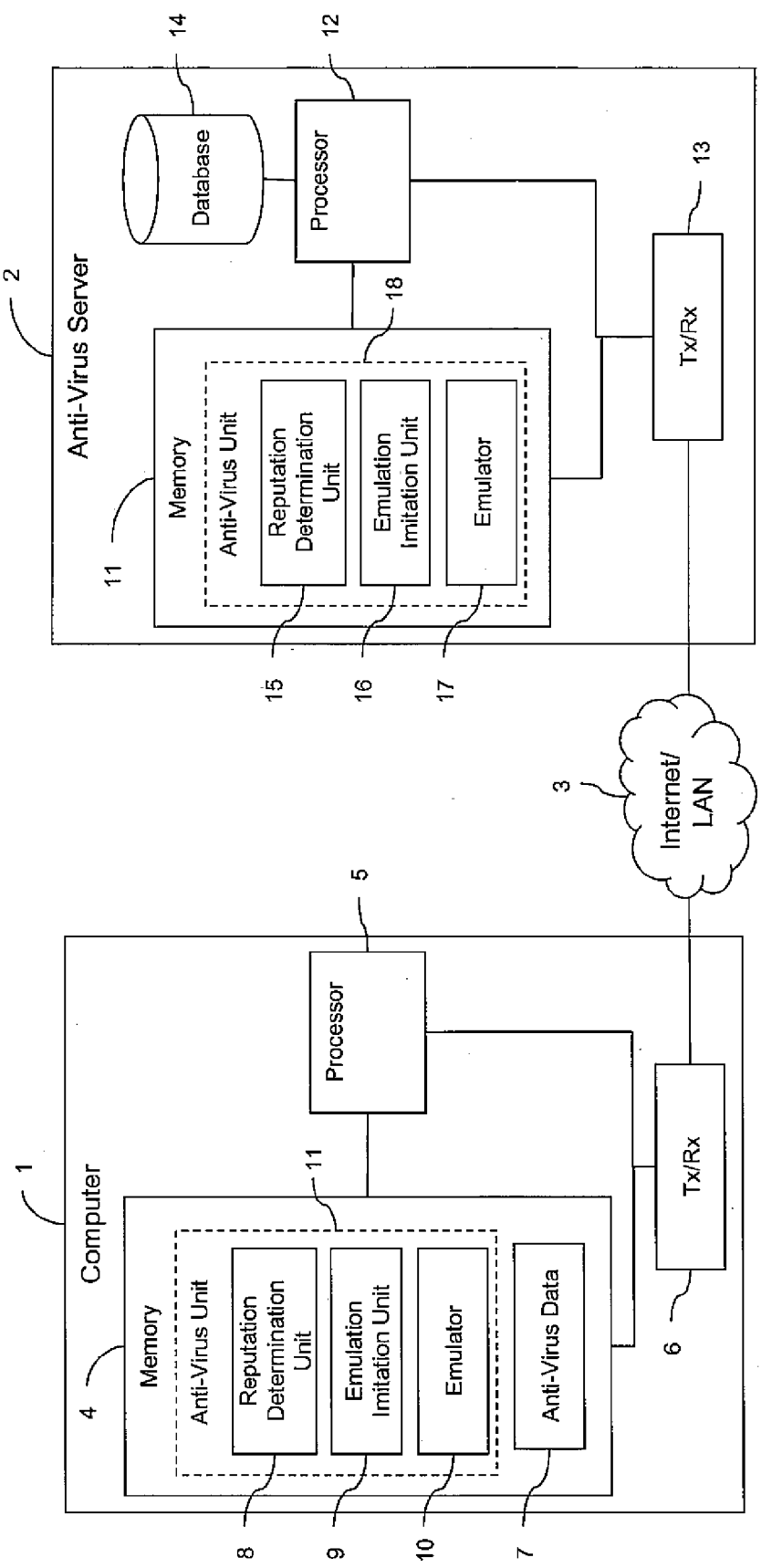
FIG. 1 illustrates schematically a malware protection system according to an embodiment of the present invention.

FIG. 1 illustrates schematically a malware protection system according to an embodiment of the present invention. The malware protection system comprises at least one computer system 1 connected to a centralised anti-virus server 2 over a network 3 such as the Internet or a LAN. The computer system 1 can be implemented as a combination of computer hardware and software. The computer system 1 comprises a memory 4, a processor 5 and a transceiver 6. The memory 4 stores the various programs/executable files that are implemented by the processor 5. The memory 4 also provides a storage unit 7 for any required data such as executable file reputation data, malware definition data, heuristic analysis rules, white lists, black lists etc. The programs/executable files stored in the memory 4, and implemented by the processor 5, include a reputation determination unit 8, an emulation imitation unit 9 and optionally an emulator 10, all of which can be sub-units of an anti-virus unit 11. The transceiver 6 is used to communicate with the central anti-virus server 2 over the network 3.

The central anti-virus server 2 is typically operated by the provider of the anti-virus unit 11 that is run on the computer 1. Alternatively, the central anti-virus server 2 may be that of a network administrator or supervisor, the computer 1 being part of the network for which the supervisor is responsible. The central anti-virus server 2 can be implemented as a combination of computer hardware and software. The central anti-virus server 2 comprises a memory 11, a processor 12, a transceiver 13 and a database 14. The memory 11 stores the various programs/executable files that are implemented by the processor 12. The programs/executable files stored in the memory 11, and implemented by the processor 12, include a reputation determination unit 15, an emulation imitation unit 16 and optionally an emulator 17, all of which can be sub-units of an anti-virus unit 18. These programs/units may be the same as those programs implemented at the computer system 1, or may be different programs that are capable of interfacing and co-operating with the programs implemented at the computer system 1. The transceiver 13 is used to communicate with the computer system 1 over the network 3. The database 14 stores the latest executable file reputation data, malware definition data, heuristic analysis rules, white lists, black lists etc.

Figure 2:
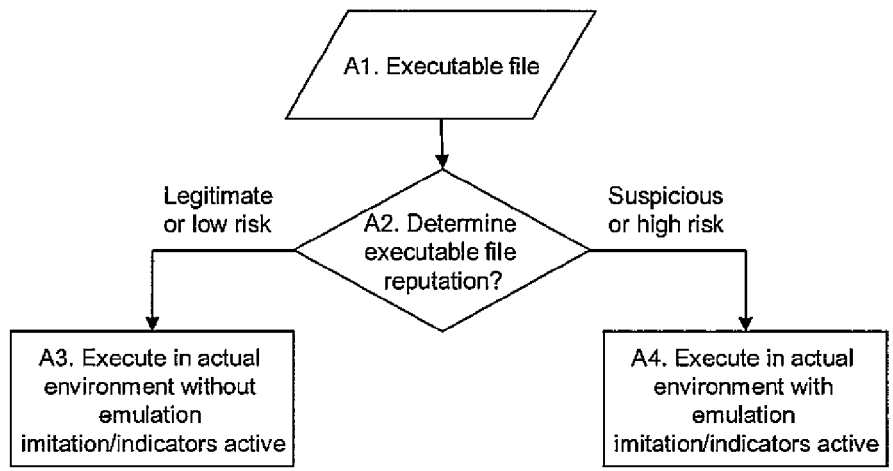
FIG. 2 is a flow diagram illustrating the process of protecting a computer from malware according to an embodiment of the present invention.

FIG. 2 is a flow diagram illustrating the process of protecting a computer from malware according to an embodiment of the present invention. The steps are performed as follows:

A1. The computer system 1 initiates a check of an executable file. For example, the check can be initiated due to receipt of the executable file, the imminent running/execution of the executable file, or as part of a requested or scheduled scan of the executable files on the computer system 1.

A2. The reputation determination unit 8 of the computer system 1 checks the reputation of the executable file.

A3. If the reputation determination unit 8 determines that the file could possibly be or is likely to be malware, then the executable file is executed by the computer system 1, whilst the emulation imitation unit 9 provides indications to the executable file that it is being executed in an emulated environment.

A4. If the reputation determination unit 8 determines that the file is or is likely to be legitimate/trustworthy, then the executable file is executed in the computer system without any emulation imitation applied to it.

In one possible embodiment of the present invention, the reputation of an executable file can be checked by comparing an identifier for the file (i.e. the filename, a hash of the file itself or the files location/path in the system) against a list of identifiers for executable files that are considered to be legitimate, otherwise known as an approved or white list. If the file is identified as being on the white list then the computer system 1 could be configured or instructed to permit execution of the file in the real (i.e. as opposed to a virtual) environment without any active emulation indicators. If the file is not identified as being on the white list, then the computer system 1 could be configured or instructed to execute the file with any emulation indicators active, as a precaution against potential malicious behaviour. Of course, program/executable files include any type of executable file, such as binary files, script files, application files, Dynamic Link Libraries, macros, XML etc As an alternative, or in addition to checking the file against a white list of files, an identifier for the file could be compared against a list of identifiers for executable files that are not recognised as legitimate or are otherwise considered to be high risk, also known as a block or black list. For those files identified as being on the black list, the computer system 1 could be configured or instructed to execute the file in the real computer system environment with any emulation indicators active, as a precaution against potential malicious behaviour. In other words, the file would be prohibited from executing in the unprotected system. If the file is not identified as being on the black list, then the computer system 1 could be configured or instructed to execute the file without any active emulation indicators. Alternatively, if a file is not identified as being on either a white list or a black list, then the computer system 1 could be configured or instructed to prompt the user to select whether the file should be executed at all, or whether it should be executed with or without active emulation indicators.

As an alternative, or in addition to checking the file against a white list of files, an identifier for the file could be compared against a list of identifiers for executable files that are not recognised as legitimate or are otherwise considered to be high risk, also known as a block or black list. For those files identified as being on the black list, the computer system 1 could be configured or instructed to execute the file in the real computer system environment with any emulation indicators active, as a precaution against potential malicious behaviour. In other words, the file would be prohibited from executing in the unprotected system. If the file is not identified as being on the black list, then the computer system 1 could be configured or instructed to execute the file without any active emulation indicators. Alternatively, if a file is not identified as being on either a white list or a black list, then the computer system 1 could be configured or instructed to prompt the user to select whether the file should be executed at all, or whether it should be executed with or without active emulation indicators. The way in which the system treats unknown files would be configured depending upon the desired level of security.

Figure 3:
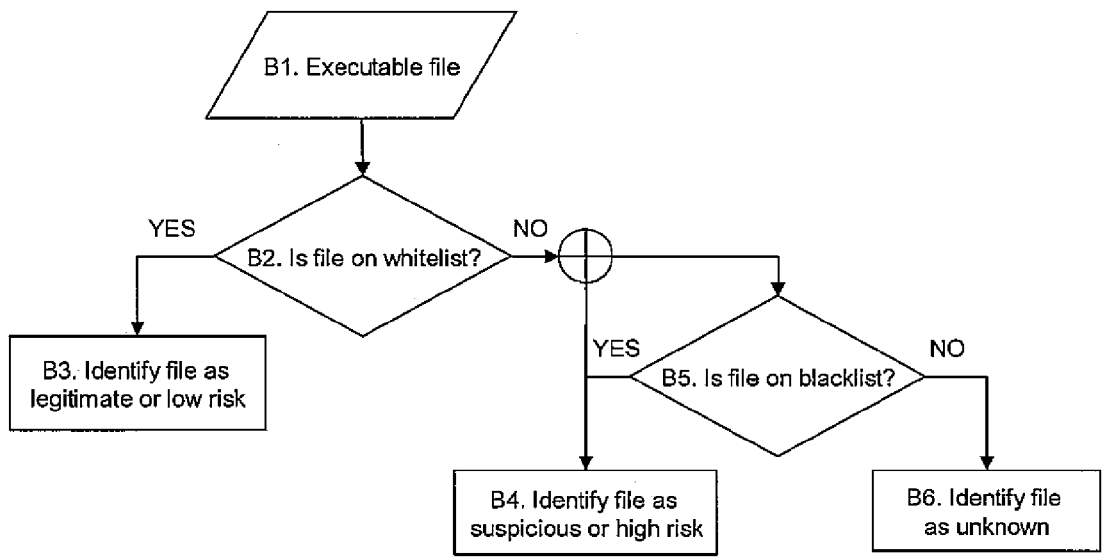
FIG. 3 is a flow diagram illustrating the process of performing a reputation check according to an embodiment of the present invention.

By way of example, FIG. 3 is a flow diagram illustrating the process of performing a reputation check according to an embodiment of the present invention. The steps performed are as follows:

B1. The computer system 1 initiates a check of an executable file.

B2. The reputation determination unit 8 (e.g. of the computer system 1 or of the server 2) performs a look-up for an identifier of the executable file in a white list of legitimate/trusted executable files.

B3. If the file is identified as being on the white list, then the file is determined to be legitimate.

B4. If the file is not identified as being on the white list, then the file is determined to be possible malware.

B5. Alternatively, if a black list of executable files is also available, then the reputation determination unit 8 performs a look-up for an identifier of the executable file in the black list of prohibited/suspicious executable files. If the file is identified as being on the black list, then the file is determined to be possible malware (as per step B4).

B6. If the file is not identified as being on either the white list or the black list, then the file is determined to be unknown.

Of course, any other variations on these processes are also possible. For example, any files identified as being on a black list could be prevented from executing at all, or could be executed in a virtual environment, whilst unknown files (e.g. those not on a white list or a black list) are executed in the actual environment with the emulation imitation applied to them. Alternatively, any unknown files could initially be executed in a virtual environment and analysed to determine whether or not they can be trusted, by checking for malware signatures or suspicious behaviour. If this analysis determines that the unknown file is not suspicious or is at low risk of being malware, then this file could be allowed to run in the actual environment, with or without emulation imitation. An identifier for the file could then be added to the white list if applicable. Conversely, if the analysis of a previously unknown file determines that the files should be considered suspicious, then this file could be prevented from executing, or could be limited to executing in the actual environment with emulation imitation active. An identifier for the suspicious file could also be added to the black list.

Figure 4:
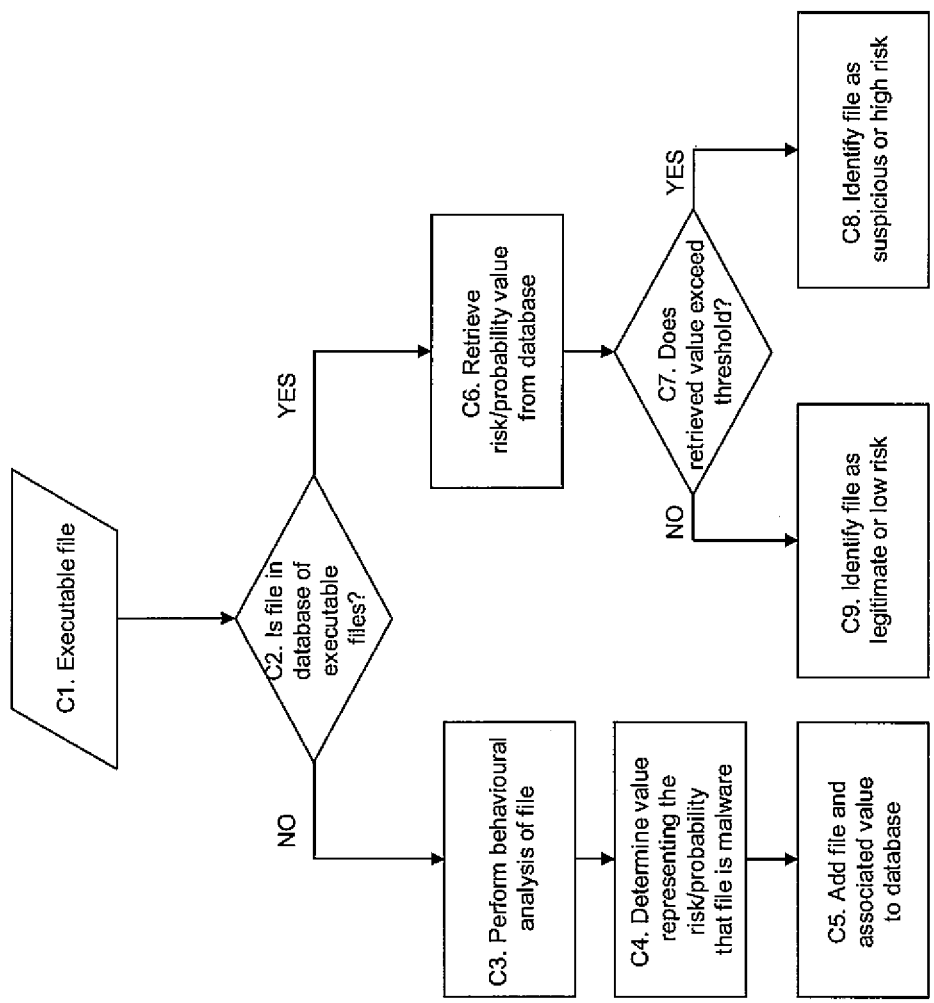
FIG. 4 is a flow diagram illustrating the process of performing a reputation check according to an embodiment of the present invention.

As an alternative to white lists and black lists, the reputation check would make use of a list of executable file identifiers wherein each executable file in the list is associated with a reputation score or rating that represents the risk/probability that the file is malware. This score or rating could be determined based on the results of some previous analysis of the executable file. For example, FIG. 4 is a flow diagram illustrating the process of performing a reputation check according to an embodiment of the present invention. When a reputation check for an executable file is required, a look-up is performed in the database of executable files to determine if the file has an entry in the database (step C2). If the file is not in the database (i.e. the file has not previously been executed by a computer system), then the file is executed, either within the actual environment provided by the computer system/server or within an emulated environment implemented by the computer system/server, and the behaviour of the program monitored (step C3). The behaviour is then analysed for suspicious behaviour and given a legitimacy/trustworthiness score depending upon the amount, type and extent of any suspicious behaviour (step C4). This score is then be provided to the central server and collated within any other scores calculated/received for the same executable file, and the collated score distributed to other computer systems in the network (step C5).

Once an entry for the executable file has been added to the database any subsequent checks of the database will identify that file's entry in the database, and the probability value for that executable file can be retrieved (step C6). This retrieved value can then be compared to a threshold value (step C7). If the retrieved value exceeds the threshold value, then the executable file should be treated as suspected malware (step C8) and only executed with emulation imitation active. If the retrieved value does not exceed the threshold value, then the executable file should be considered to be trustworthy (step C9) and can be executed without emulation imitation active.

The reputation score of a particular file could be continually updated by collating the results of behavioural analyses performed by other computer systems and/or servers. In addition, the threshold score used by an individual computer could depend upon any number of factors (e.g. depending upon the security level desired by the user), and could vary between individual computers. The reputation score could also be determined and/or varied depending upon the reputation of the computer systems that have installed and/or run the executable file, and that have reported this to the central server. For example, if the central server receives a number of reports that a particular executable file has been installed and/or run from computer systems that are known to be trustworthy (e.g. they belong to a trusted software developer or other trusted entity), then the reputation score of that executable file would improve. In particular, the reputation score given to such an executable file by the malware protection system would be higher than that of an executable file of which it has only just become aware.

The checking of an executable files reputation may be performed locally by the computer system 1, remotely by the centralised server 2, or by a combination of the two. When the check is performed locally, then depending upon how the reputation check is performed, the computer system 1 could use reputation information that has been received from the centralised server 2 and stored within its memory. When the check is performed remotely, the computer system 1 would send the executable file or information relating to that file to the centralised server 2 in order for it to check the files reputation. For example, the computer system 1 could send an identifier for the file to the server, which would then check this against a database of legitimate executable files. The server 2 would then respond to the computer system 1 notifying it of the result of the check and/or providing an instruction as to how to the file should be, executed.

The reputation check can be performed upon receipt of an executable file (i.e. when the file is downloaded from the internet or from an email, or when the file is transferred from some computer readable medium to the computer system), or in response to a request to execute/run the file. The check could also be performed as part of a scheduled scan of the computer system 1 or upon a request by the user. However, it is preferable that the check is made prior to the first execution of the file.

There are various techniques used by malware authors to enable a malware program to determine that it is running in an emulated environment, and that therefore can be used to deceive the malware into determining that it is being executed in an emulated environment. Whilst an emulator should behave essentially identically to the actual computer system, it is difficult to implement all of this real functionality in an emulated environment. For example, processing limitations can prevent an emulated environment from mimicking all of the functionality provided by an operating system. As such, there will almost always be behavioural differences between the response of an emulator and that of an actual computer system, and these differences can therefore be used by a program to determine when it is being executed in an emulated environment. As an example, a malware program could be designed to call uncommon or infrequently used instructions that, as they are almost never used by other programs and/or are too difficult to emulate, may not be supported by an emulator. Calling such functions is therefore likely to cause an emulator to throw an exception. The malware program can then use this exception as an indication that it is being emulated.

Malware programs can also attempt to detect emulation by attempting to access a webpage, and thereby determining whether it has access to the Internet. As most emulators do not allow access to the Internet, the malware could use this as an indication that it is being executed in an emulator. In addition, many malware programs use calls that return the computer systems IP address to determine whether or not they have access to the Internet. Again, as most emulators do not allow access to the Internet, an emulator is unlikely to successfully return an IP address. The malware program can therefore use this as an indicator that it is being executed in an emulated environment.

An alternative method of detecting whether an emulator is running is to make more than one call to a function that should return different values in response to each call. For example, this could involve making two calls to a function that provides some time dependent response, and verifying that there is a difference between two returned values. In Microsoft® Windows® this could be achieved using the QueryPerformanceCounter API or GetTickCount API, or by querying the current number of cycles executed by the processor since the machine started using the RDTSC (Read Time-Stamp Counter) instruction. For example, the RDTSC could be called twice and the difference of the two returned values calculated. This difference could then be compared to a threshold and, if the difference is greater than the threshold, it could then be determined that the file is currently being executed in an emulator.

There are a number of other methods that may be used by an executable file to determine whether or not it is being executed in an emulated environment, and these are constantly expanding to include new methods. By way of example, some other methods used to detect emulation include:
- checking the registry for the presence of particular registry keys (e.g. registry keys relating to VMWare® tools etc);
- checking for the presence of particular installed applications (e.g. memory dump tools, analysis tools, debuggers etc);
- checking for breakpoints; and
- checking the location of the Interrupt Descriptor Table (IDTR) or other software registers.

In order to fake the characteristics that usually indicate emulation, the computer system can hook into the APIs (Application Programming Interfaces) used by a selected executable file (i.e. that enable it to check the file system, the registry entries, mutexes etc and whatever else it may use to detect emulation or other malware analysis tools). The computer system can then provide information to the run-time code of the selected executable file that makes it appear as though the file is being executed in an emulated environment. This allows the computer system to fake emulation for selected files, whilst not affecting the information provided to those executable files that are not considered a risk.

The term hooking covers a range of techniques used to alter or add to the behaviour of a program (e.g. an operating system or an application) by intercepting function calls, messages or events passed between software components. The hooking mechanism enables a piece of code to be specified to run whenever a particular message or event is received by a program. For example, in Microsoft® Windows® the SetWindowsHookEx( ) Win32 API call causes the target process to load a specified DLL into its memory space and select a specified function as a hook for a particular event. When an appropriate event is received, the code will be executed by the target process.

By way of example, if a reputation check on a particular executable file determined that this file should be executed with emulation imitation applied to it, then the computer system 1 could hook into any calls made by the executable files run-time code to retrieve the computer systems IP address (e.g. GetIpAddrTable API or GetHostByName API) and return an exception. In doing so, the computer system 1 could fool the malware program into determining that it is being executed in an emulator. Alternatively, some malware programs are designed not to perform any malicious functions in a particular country. This may be because the authorities in a particular country may be more motivated to identify and punish malware authors. As such, these malware programs may request the IP address of the computer system in order to determine the country in which the computer system is currently residing. The computer system 1 could therefore respond with an IP address that indicates that the computer system is residing in one such country, and therefore prevent the malware from executing any malicious functionality.

Figure 5:
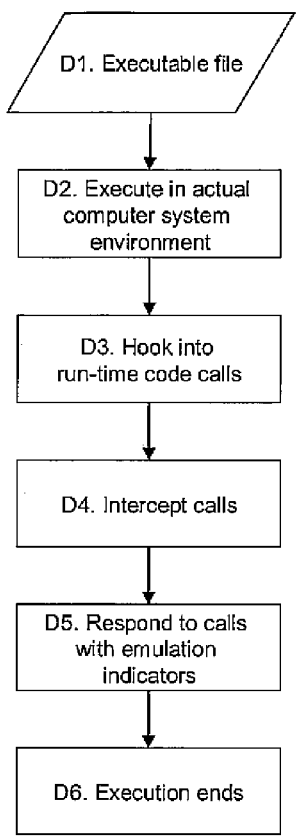
FIG. 5 is a flow diagram illustrating the process of protecting a computer system from malware according to an embodiment of the present invention.

FIG. 5 is a flow diagram illustrating the process of protecting a computer system from malware according to an embodiment of the present invention. The steps performed are as follows:

D1. A reputation check of an executable file by the reputation determination unit 8 determines that the file could be malware. For example, the file is not on a white list, or appears on a black list.

D2. The computer system 1 is therefore instructed or configured to apply the malware protection process, and executes the executable file in the actual/non-emulated computer system environment.

D3. The emulation imitation unit 9 hooks into certain specified communications between the executable file and the computer system 1 during the execution of the file. These specified communications can include any function calls, messages and events that are relevant to the anti-emulation functionality of malware.

D4. The hooks implemented by the emulation imitation unit 9 allow it to intercept any of the relevant communications.

D5. For any intercepted communications the emulation imitation unit 9 responds with data that indicates to the executable file that it is being executed in an emulated environment, despite actually being executed in the non-emulated computer system environment. These emulation indicators fool the executable file into determining that it is being executed in an emulated environment, such that the executable file does not execute any malicious functions.

D6. The execution of the executable file is terminated. For example, the executable file may be terminated by the file itself in response to determining that it is being emulated, at the end of the execution of the file, or by the computer system.

As described above, conventional methods of protecting a computer from malware rely upon detecting malware using a malware signature or by identifying behaviour that is considered to be indicative of malicious functionality. However, malware authors use various techniques to avoid these detection methods. As such, these malware detection methods can fail to detect a malware program, which can therefore continue to perform its malicious functions. The methods proposed here provide that a computer system can make use of malware anti-emulation functions as a means for neutralising or deactivating the malicious functionality of a malware program, even if the malware programs presence has not been detected. Furthermore, these methods also provide that legitimate applications that also implement anti-emulation functions are not affected.

In addition to using the anti-emulation functions of malware as a means of protecting a computer system from malicious behaviour, it is also proposed here to use detection of anti-emulation behaviour as a means of determining whether or not an executable file should be considered suspicious. Whilst both legitimate executable files and malicious executable files can implement anti-emulation functions, their behaviour upon detection of emulation can be markedly different. Legitimate programs usually refuse to start and display a notification that the application does not run within an emulated environment. In contrast, malware programs will usually either fall silent or significantly alter their behaviour. As such, for an executable file executed in an emulated environment or in a real environment with emulation imitation active, the presence of such anti-emulation behaviour is an indication that the file may be malware.

Figure 6:
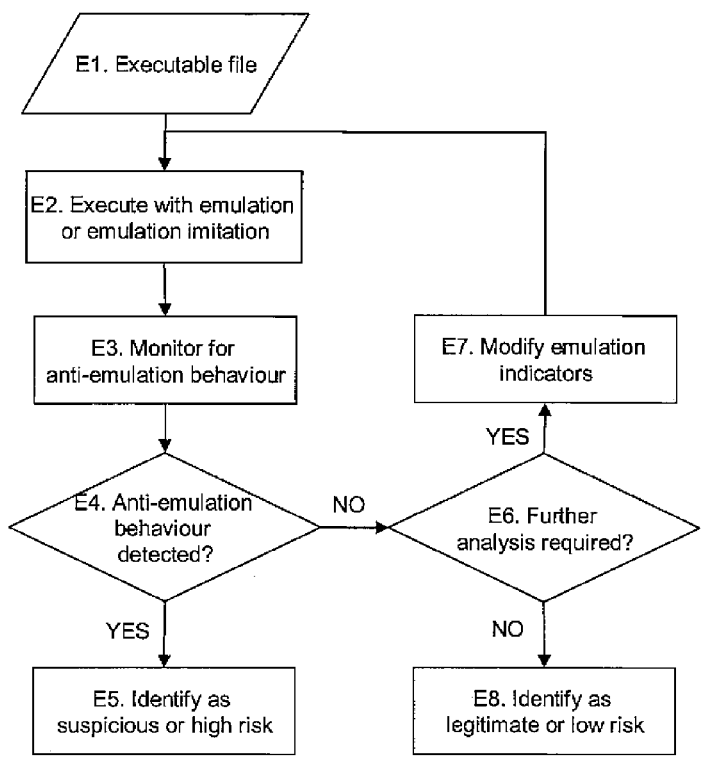
FIG. 6 is a flow diagram illustrating the process of detecting potential malware according to an embodiment of the present invention.

By way of example, FIG. 6 is a flow diagram illustrating the process of detecting potential malware according to an embodiment of the present invention. The steps performed are as follows:

E1. An executable file that is due to be executed by the computer system 1 is determined as being unknown to the malware protection system.

E2. In such a case, either the user or the malware protection system could decide to execute the file within an emulated environment or in the real environment with emulation imitation applied to it. This execution is performed either at the central server 2 or at the computer system 1.

E3. The malware protection system monitors the execution of executable file.

E4. The malware protection system determines if the executable file displays any anti-emulation behaviour during its execution.

E5. If the executable file displays anti-emulation behaviour during its execution, then the executable file is determined to be suspicious and therefore possible malware.

E6. If the executable file does not display any significant anti-emulation behaviour during its execution, then the malware protection system will determine whether further analysis is required. For example, the malware protection system could determine that it needs to perform a comparison of the behaviour of the executable file when it believes it is being executed in an emulated environment, with its behaviour when it believes it is being executed in a non-emulated environment.

E7. If it is determined that further analysis is required, then the malware protection system would modify the data that has been provided to the executable file during its previous execution. For example, it may 'turn off' some or all of the emulation indicators such that the executable file will determine that is not being emulated. The process then returns to step D2 and the file is executed.

E8. If the executable file has not displayed any significant anti-emulation behaviour, and if no further analysis is required, then the malware protection system can identify the file as being legitimate/trustworthy, or at least as having a low probability of being malware.

If the file is legitimate it would be expected to either generate a notification that it does not run in an emulated environment, or to display consistent behaviour irrespective of whether it is provided with indications that it is running in an emulated environment or in a non-emulated environment. If the file is malware it would be expected to either fail to run without providing any notification, or to display behaviour that differs depending upon whether it is provided with indications that it is running in an emulated environment or in a non-emulated environment. Depending upon the outcome of this behavioural analysis, an identifier for the file could be added to a white list or black list as appropriate, and updated lists distributed from the central server to the individual computer systems. Alternatively, and as described above, this analysis could determine a reputation score for the executable file, and this information could then be provided to the computer systems in the form of a file reputation list or database.

As a further example, it is also likely that some malware programs will be designed to gather information about emulated environments used by anti-virus software. When such a malware program determines that it is being executed in an emulated environment, it will try to collect as much information as possible from this emulated environment and send this information to a location where it can be accessed by the malware author (e.g. to the authors home server). The malware protection system can therefore monitor the behaviour of an executable file that is being executed within an emulated environment or within a real environment with emulation imitation applied to it, to determine if the executable file performs a significant number of information collecting operations and attempts to connect to a remote location. If so, then this executable file can be considered suspicious and at high risk of being malware.

The methods of malware detection proposed here provide that a computer system can make use of malware anti-emulation functions as a means for determining whether or not an executable file should be considered suspicious, which can therefore be used as feedback to determine how further instances of an executable file should be executed. This method overcomes the limitations of malware detection methods that rely on identifying malware signatures or the malicious/aggressive activity of malware, and makes use of the malware's own defence mechanisms as a means of detection.

Some malware programs are designed to retaliate if they believe they are being run in an emulated environment, by performing actions that are intended to crash the emulator or otherwise prevent it from analysing the malware program. For example, upon detecting emulation, a retaliatory malware program could react by attempting to delete all the files in the computer system or otherwise try to damage the functionality of the operating system. However, such retaliatory malware programs are rare as such behaviour reveals the malware programs presence. In any case, if the malware protection system of the present invention were to come across such a retaliatory malware program, the system could be configured to make suitable adjustments to its emulation settings in order to end the offensive behaviour, and could use this retaliatory behaviour as a means for detecting the malware. For example, the malware protection system could respond to retaliatory behaviour using host intrusion prevention mechanisms, thereby preventing the malware from continuing with any deletion operations, or would simply prevent any further execution of the malware program.

It will be appreciated by the person of skill in the art that various modifications may be made to the above described embodiments without departing from the scope of the present invention. For example, whilst the above embodiments specifically describe using the anti-emulation functions of malware to prevent malicious behaviour and/or to detect the presence of the malware, this also includes making use of any malware anti-debugging functions. Debugging malware involves analysing the behaviour and functionality of a malware program in order to understand how to detect and/or disinfect it, and malware authors often design their malware to prevent debugging. The anti-debugging functions employed by malware correspond to their anti-emulation functions and can include detecting a debugger, refusing to execute when being debugged, preventing execution of any malicious functionality when being debugged, preventing a debugger program from attaching to the malware program, impeding the debugging process etc.

The invention claimed is:

1. A method of detecting malware in a computer system, the method comprising:
   determining that an executable file should be identified as not being legitimate by inspecting a database containing identifiers of legitimate and/or not legitimate executable files;
   executing the executable file in an emulated environment;
   monitoring the behaviour of the executable file to determine that the executable file, aware that it is being executed in the emulated environment, is taking evasive action by failing to respond in a way in which it would be expected to act when executed in a real environment, wherein the evasive action comprises at least one of failing to request access to the Internet, failing to attempt to provide a notification, and failing to attempt to collect information relating to the emulated environment; and
   determining that the executable file is malware.

2. A method as claimed in claim 1, wherein the step of determining that an executable file should be identified as not being legitimate is performed at the computer system.

3. A method as claimed in claim 1, wherein the step of determining that an executable file should be identified as not being legitimate comprises:
   determining if an identifier for the executable file is contained in a database identifying legitimate executable files and, if not, identifying the executable file as not legitimate;
   determining if an identifier for the executable file is contained in a database identifying prohibited executable files and, if so, identifying the executable file as not legitimate; and
   determining if an identifier for the executable file is contained in a database relating to executable files, the database including a value indicating the legitimacy of each executable file and, if so, determining if the value associated with the executable file does not exceed a threshold at which an executable file is considered to be legitimate.

4. A method as claimed in claim 1, further comprising monitoring whether the executable file attempts to connect to a remote location while being executed in the emulated environment, and if so, determining that the electronic file is malware.

5. A non-transitory computer storage medium having stored thereon a computer program comprising computer program code means that performs:
   determining that an executable file should be identified as not being legitimate by inspecting a database containing identifiers of legitimate and/or not legitimate executable files;
   executing the executable file in an emulated environment;
   monitoring the behaviour of the executable file to determine that the executable file, aware that it is being executed in the emulated environment, is taking the evasive action by failing to respond in a way in which it would be expected to act when executed in a real environment, wherein the evasive action comprises at least one of failing to request access to the Internet, failing to attempt to provide a notification, and failing to attempt to collect information relating to the emulated environment; and
   determining that the executable file is malware.

6. A computer system comprising:
   at least one processor; and
   at least one non-transitory memory including computer program code, the at least one processor and computer program code configured to, with the at least one processor, cause the computer system to perform:
   determining that an executable file should be identified as not being legitimate by inspecting a database containing identifiers of legitimate and/or not legitimate executable files,
   executing the executable file in an emulated computer system,
   monitoring the behaviour of the executable file to determine that the executable file, aware that it is being executed in the emulated environment, is taking evasive action by failing to respond in a way in which it would be expected to act when executed in a real environment, wherein the evasive action comprises at least one of failing to request access to the Internet, failing to attempt to provide a notification, and failing to attempt to collect information relating to the emulated environment, and
   determining that the executable file is malware.

7. A computer system as claimed in claim 6, wherein the processor is further configured to generate a message for sending to a server, the message including the executable file or an identifier for the executable file, and to process a response received from the server to determine if it indicates that the file should be identified as not being legitimate.

8. A computer system as claimed in claim 6, wherein the memory is further configured to store a database identifying legitimate executable files, and the processor is further configured to determine if an identifier for the executable file is contained in the database identifying legitimate executable files.

9. A computer system as claimed in claim 6, wherein the memory is further configured to store a database identifying prohibited executable files, and the processor is further configured to determine if an identifier for the executable file is contained in the database identifying prohibited executable files.

10. A computer system as claimed in claim 6, wherein the memory is further configured to store a database of information relating to executable files, the database including a value indicating the legitimacy of each executable file, and the processor is further configured to determine if an identifier for the executable file is contained in the database.

11. A computer system as claimed in claim 10, wherein the processor is further configured to, if an identifier for the executable file is contained in the database of executable files, determine if the value associated with the executable file exceeds a threshold at which an executable file is considered to be legitimate.

12. A computer system as claimed in claim 6, wherein the processor is further configured to monitor whether the executable file attempts to connect to a remote location while being executed in the emulated environment, and if so, determine that the executable file is malware.

13. An apparatus for detecting potential malware, the apparatus comprising:
   at least one processor; and
   at least one non-transitory memory including computer program code, the at least one processor and computer program code configured to, with the at least one processor, cause the apparatus to perform:
   determining that the executable file should be identified as not being legitimate by inspecting a database containing identifiers of legitimate and/or not legitimate executable files, executing the executable file in an emulated computer system, monitoring the behaviour of the executable file to determine that the executable file, aware that it is being executed in the emulated environment, is taking the evasive action by failing to respond in a way in which it would be expected to act when executed in a real environment, wherein the evasive action comprises at least one of failing to request access to the Internet, failing to attempt to provide a notification, and failing to attempt to collect information relating to the emulated environment, and determining that the executable file is malware.

* * * * *